United States Patent [19]
Holliday et al.

[11] Patent Number: 6,084,047
[45] Date of Patent: Jul. 4, 2000

[54] ELASTOMERIC AMORPHOUS OLEFIN TERPOLYMER

[75] Inventors: Robert Emmett Holliday; Richard Kingsley Stuart, Jr., both of Longview, Tex.

[73] Assignee: Eastman Chemical Company, Kingsport, Tenn.

[21] Appl. No.: 08/965,226

[22] Filed: Nov. 6, 1997

Related U.S. Application Data

[60] Provisional application No. 60/030,227, Nov. 7, 1996.
[51] Int. Cl.[7] .................................................. C08F 10/14
[52] U.S. Cl. ...................... 526/348.5; 526/348.2; 526/348.6; 526/916; 428/364; 428/523
[58] Field of Search .................... 526/348, 348.5, 526/916, 348.6, 348.2; 428/364, 523

[56] References Cited

U.S. PATENT DOCUMENTS

| | | | |
|---|---|---|---|
| 4,335,225 | 6/1982 | Collette et al. | 525/240 |
| 4,363,904 | 12/1982 | Fraser et al. | 526/348.2 |
| 4,826,939 | 5/1989 | Stuart, Jr. | 526/348.5 |
| 5,336,746 | 8/1994 | Tsutsui et al. | 526/348.6 |

*Primary Examiner*—Bernard Lipman
*Assistant Examiner*—Roberto Rabago
*Attorney, Agent, or Firm*—Jonathan D. Wood; Cheryl J. Tubach; Harry J. Gwinnell

[57] ABSTRACT

The present invention is an elastomeric polyolefin terpolymer comprising about 5 to 25 weight percent ethylene units, from greater than about 5 to about 40 weight percent hexene units, and about 35 to less than about 90 weight percent propylene units, wherein the total weight percent of monomer units equals 100 percent. The high molecular weight terpolymer is amorphous, is elastomeric, has a melt flow rate of about 0.01 to 500 grams per 10 minutes and has a tensile set of about 65 to 120 percent, according to ASTM D-412.

7 Claims, No Drawings

ELASTOMERIC AMORPHOUS OLEFIN TERPOLYMER

This application claims the benefit of U.S. Provisional Application No. 60/030,227, filed Nov. 7, 1996.

FIELD OF THE INVENTION

This invention relates to olefin terpolymers containing ethylene, hexene and propylene monomer units. More particularly this invention relates to amorphous ethylene-hexene-propylene terpolymers, which demonstrate highly elastomeric properties. This invention also relates to a process of producing such terpolymers using traditional Ziegler Natta catalyst systems.

BACKGROUND

There is a need in the polymers industry for a propylene-based polymer, which has both amorphous and elastomeric character. Such a product would have the novel combination of both high impact strength and high elasticity, in addition to the other properties associated with propylene-based polymers such as a relatively high melting point, low density and low crystallinity.

Stuart (U.S. Pat. No. 4,826,939) discloses a highly amorphous propylene-based olefin terpolymer made by a process wherein ethylene is very randomly incorporated into a chain along with propylene and hexene. The amorphous terpolymer of Stuart is very tacky and pressure sensitive, having a ring and ball softening point of about 75 to 120° C. The process of making the disclosed amorphous terpolymer comprises polymerizing the monomers in the presence of a traditional anionic coordination catalyst within a temperature range typical of a solution polymerization processes, about 140 to 250° C. These materials are not elastic.

Collette (U.S. Pat. No. 4,335,225) discloses that a semi-crystalline or crystalline block polypropylene having excellent elastomeric properties can be made with the use of particular titanium, zirconium, or halfnium-based catalyst systems at very low yield in a slurry process. The use of these exotic catalysts requires very mild processing conditions because the catalysts are particularly sensitive to air, heat, and light. They are not suitable or readily adaptable to a solution process.

In light of the above, it would be desirable to provide an amorphous propylene-based olefin terpolymer which is elastomeric instead of tacky. It would be further desirable for such terpolymer to be produced via an economical process that does not require an exotic or unusually temperamental catalyst system.

SUMMARY OF THE INVENTION

The present invention includes a polyolefin terpolymer that is amorphous and highly elastomeric. The polyolefin terpolymer comprises about 5 to 25 weight percent ethylene units, from greater than about 5 to about 40 weight percent hexene units, and about 35 to less than about 90 weight percent propylene units, wherein the total weight percent of monomer units equals 100 percent. The polyolefin terpolymer has a melt flow rate of about 0.01 to 500 grams per 10 minutes and a tensile set of about 65 to 120 percent, according to ASTM D-412. Also included as part of the present invention is a process of forming the polyolefin terpolymer which comprises polymerizing a mixture comprising about 0.5 to 20 weight percent ethylene, about 1 to 45 weight percent 1-hexene, and about 20 to 98 weight percent propylene, in the presence of a catalytically effective amount of Ziegler Natta catalyst at a temperature of about 140 to 250° C. and a pressure of about 100 to about 4,000 pounds per square inch gauge.

DETAILED DESCRIPTION OF THE INVENTION

The applicants have unexpectedly discovered a process by which an amorphous, highly elastomeric terpolymer of ethylene, hexene, and propylene units is produced. The presence of a particular proportion of monomers at high temperature was found to provide the proper reaction conditions to form the terpolymer of the present invention.

The characteristics of the terpolymer formed by the process of the present invention is surprising in light of the tacky amorphous terpolymer formed by the process disclosed by Stuart (U.S. Pat. No. 4,826,939). The process of the present invention uses basically the same reactants, catalyst, temperature, and pressure as that disclosed by Stuart, yet the particular monomer concentration of the present process and lack of chain transfer agents effect the formation of a different amorphous terpolymer having a tremendously higher degree of elasticity.

Further, in the process of the present invention a propylene-based terpolymer is provided that has a high degree of elasticity. This result is unexpected since Collette (U.S. Pat. No. 4,335,225) discloses that one of the exotic tetraneopentyl zirconium or tetrabenzyl hafnium aluminate catalyst systems is required in order to produce an elastomeric polypropylene which contains up to about 10 percent modifying olefin monomer units. However, by polymerizing the reactants at high temperature in the presence of a traditional Ziegler Natta catalyst, with no chain transfer agent, an amorphous, elastomeric terpolymer having good tensile properties is formed.

The process of the present invention comprises polymerizing a mixture of from about 0.5 to 20 weight percent ethylene, about 1 to 45 weight percent 1-hexene, and about 20 to 98 weight percent propylene, in the presence of a catalytically effective amount of a Ziegler Natta catalyst at a temperature of from about 140 to about 250° C. and a pressure of about 100 to about 4,000 pounds per square inch gauge. In order to provide an amorphous terpolymer product, the process of the present invention is carried out in a manner to provide a high degree of random incorporation of comonomers, especially the ethylene units. To obtain more reproducible high comonomer incorporation, the present process is preferably conducted as a continuous process, instead of a batchwise process.

The polymerization reactant mixture preferably comprises about 1 to 20 weight percent ethylene, about 2 to 40 weight percent 1-hexene, and about 25 to 97 weight percent propylene. A more preferable mixture composition would be about 2 to 20 weight percent ethylene, about 5 to 40 weight percent 1-hexene, and about 30 to 93 weight percent propylene. When conducting the present process in a continuous manner, the reactants are charged to the continuous polymerization vessel at a delivery rate such that a constant composition is made relative to the residence time.

Another reason for conducting the present process as a continuous operation is that a high dilution environment is easier to maintain when solid product is being continuously or intermittently removed from the reaction mixture. The polymerization mixture, including all reacted and unreacted olefins, catalyst materials, solvent, and reaction by-products, preferably contains between about 5 to 45 percent solids at any time throughout the process. The percent solids is more preferably about 10 to 40, with about 15 to 30 percent solids being more preferable. The amount of solvent needed is determined by the concentration of solids. A dilute polymerization mixture is more easily stirred in the reaction vessel, with polymer being more easily removed from the vessel. However, high dilution is not necessary for the formation of the terpolymer.

Suitable polymerization solvents include the aliphatic hydrocarbons and aromatic solvents known to be suitable for Ziegler Natta catalyzed reactions. Examples include solvents such as hexane, heptane, cyclohexane, toluene, mixed xylenes, and a combination thereof. A particularly preferred solvent is the petroleum fraction of an aliphatic hydrocarbon mixture commonly referred to as mineral spirits.

The process of the present invention is particularly useful because it is carried out using a traditional Ziegler Natta catalyst. The term "Ziegler Natta catalyst", as used herein, refers to the combination of catalyst and cocatalyst. Such catalysts can be supported catalysts or prepolymerized catalysts. Suitable catalysts are generally any Ziegler Natta catalyst known in the art to give high activity and high crystallinity with propylene and to incorporate other monomers effectively. Preferred catalysts are anionic coordination types such as aluminum reduced-titanium trichloride activated by trituration (AA-TiCl$_3$), TiCl$_4$ supported on MgCl$_2$, and TiCl$_3$ supported on MgCl$_2$, with supported TiCl$_3$ catalysts being more preferred. The exotic catalyst used by Collette (U.S. Pat. No. 4,335,225) such as titanium, zirconium, or halfnium-based catalyst systems are not useful because such catalysts would be inactive due to the high temperature of the present process. Suitable commercial catalysts for the present process include LYNX 900, by Catalyst Resources, and THC, by Toho Titanium Company. The cocatalyst required as part of the Ziegler Natta system of the present invention can be any aluminum alkyl known in the art such as triethyl aluminum, triisobutyl aluminum or trimethyl aluminum.

A suitable concentration of catalyst in the polymerization mixture is a delicate balance. A presence of too much catalyst is manifested by reactor overheating and run-away reaction, etc., while a presence of too little catalyst results in high off gas and poor product production. The cocatalyst to catalyst mole ratio of the present process is from about 0.25:1 to 100:1, preferably about 0.5:1 to 20:1, with about 1:1 to 10:1 being more preferred.

The addition of a third component to the catalyst system such as stereoregulators or so-called electron donors is a useful option. Any electron donor known in the art such as ethyl benzoate and methoxybenzene is suitable. Of particular usefulness is 2,4-dimethyl piperazine (DMP), which is an amine that provides the benefit of more uniform comonomer incorporation and less atactic polymer formation. Any donor such as esters, ethers, amines or dibasic electron donors are suitable.

The conditions under which the present process is conducted are typical for solution polymerization of polyolefins. Suitable temperatures are about 120 to 250° C., with about 130 to 160° C. being preferable. Suitable pressures are from about 100 to 4,000 psig (pounds per square inch gauge), preferably about 750 to 1,500 psig. General process operating parameters of the present invention not specifically described herein are the basic polymerization conditions and techniques disclosed in U.S. Pat. No. 3,923,758 for the preparation of propylene polymers.

The amorphous, elastomeric terpolymer formed by the present process is a novel feature of the present invention. The present polyolefin terpolymer comprises about 5 to 25 weight percent ethylene units, from greater than about 5 to about 40 weight percent hexene units, and about 35 to less than about 90 weight percent propylene units, wherein the total monomer units equals 100 weight percent, wherein said terpolymer is elastomeric and amorphous and has a melt flow rate of about 0.01 to 500 grams per 10 minutes and a tensile set of about 65 to 120 percent. The term "amorphous", as used herein, means that the terpolymer is greater than 80 percent soluble in boiling hexane and exhibits no DSC (differential scanning calorimetry) melting point.

The preferred terpolymer comprises from greater than 10 to about 25 weight percent ethylene units, greater than 10 to about 40 weight percent hexene units, and from about 35 to 85 weight percent propylene units. The more preferred terpolymer comprises about 8 to 20 percent ethylene units, about 8 to 35 percent hexene units, and about 40 to 90 percent propylene units, with unit weight percentages of about 8 to 15 ethylene, 8 to 30 hexene, and about 50 to 90 propylene being most preferred.

The terpolymer of the present invention is a high molecular weight polymer having very high melt viscosity. It was unexpected to find that, in making the terpolymer of the present invention, a high molecular weight is required to provide elastomeric properties. The melt flow rate ranges from 0.01 to 500 grams per 10 minutes at 230° C., according to ASTM D-1238, condition F. The preferred melt flow rate is about 0.5 to 30 grams per 10 minutes, with about 1 to 10 grams per 10 minutes being more preferred.

The glass transition temperature ($T_g$) of the present terpolymer is very low, providing a polymer having high impact strength. The $T_g$ is preferably from about (−20) to (−45)° C., with a $T_g$ of about (−20) to (−35)° C. being more preferred.

The terpolymer of the present invention is highly elastomeric. That is, the terpolymer exhibits no yield point during the tensile strength test, which is not typical for a polyolefin, but very typical of an elastomer. The tensile set test as described in U.S. Pat. No. 4,335,225 (ASTM D412) which is a measure of both the elastic stretch and recovery of the polymer, gives values for the present terpolymer in the range of about 65 to 120 percent. The preferred tensile set is about 65 to 100 percent, with about 65 to 85 percent being the more preferred tensile set. These values are well within the range expected for elastomers, and not the typical values obtained from polyolefins.

The terpolymer of the present invention has a combination of relatively high melting point, low density, low crystallinity, flexural modulus, hardness and tensile strength, high elongation and elastomeric nature which makes it ideally suited for a variety of applications. These uses include many applications presently using flexible polyvinyl chloride (PVC), ethylene vinyl acetate copolymers, low density polyethylene as well as other pure or compounded products. Examples of specific applications of the present terpolymer include extruded goods such as gaskets, tapes, tubing, membranes, hoses, wire and cable and seals; injection or blow molded products such as flexible bottles and toys; film and sheet extruded goods and flexible fibers. This terpolymer can be extrusion coated onto a variety of substrates where the combination of flexibility, elasticity and heat resistance is important. For example, it can be bonded to fibers such as in use as a backing for carpet tiles. The present terpolymer can also be used in combination with other materials. It should be noted that the present terpolymer should find additional uses as a compatible modifier to many existing polyolefins. For example, if added to modified bitumen it improves its flexibility and elongation; if added to polypropylene film resins it improves their tear strength; if added to impact copolymers it improves their blush resistance and if added to asphalt it improve its elevated temperature performance. These terpolymers also should find usefulness as a blend component in sealants and caulks. These terpolymers have excellent melt strength and should therefore promote melt strength in blends with polyolefins where melt strength is needed such as thermoforming applications.

The following examples illustrate the present invention but should not be interpreted as a limitation thereon.

EXAMPLES

Examples 1 and 2 illustrate the present invention by demonstrating the process of the present invention carried out in a continuous manner, and by showing the unexpectedly beneficial properties of the terpolymers produced thereby. In the Examples, the reactants, catalyst, and solvent were continuously charged into a continuous polymerization reactor at rates required to keep the levels of each component within the ranges required by the process of the present invention. The reactor temperature was maintained at between 130 to 180° C. Pressure was maintained at between 750 to 1,500 psig. Average residence time in the reactor was about 3.5 hours. Terpolymer was continuously withdrawn from the reactor in solution.

The particular process parameters of the two Examples are given below. Unless otherwise specified, all part, percentages, ratios, etc. are by weight.

Example 1

This example describes the continuous preparation of ethylene hexene propylene terpolymers. A 6.7 gallon stirred loop reactor was fed continuously with propylene, hexene-1, mineral spirits, ethylene and catalyst in mineral spirits (catalyst mixture or slurry). The terpolymer, unreacted monomers, and solvent mixture containing catalyst was removed from the reactor continuously to a letdown tank. Unreacted monomers were flashed overhead. The terpolymer solvent mixture of approximately 30 percent solids was fed to an extruder where it was stripped and stabilized. The extrudate was cooled in a water bath and cut into pellets. Reactor conditions and monomer conversions were as shown:

| | |
|---|---|
| Propylene Charge | 3.25 Lb/Hr |
| Hexene-1 Charge | 1.39 Lb/Hr |
| Mineral Spirits Charge | 10.42 Lb/Hr |
| Ethylene Charge | 0.28 Lb/Hr |
| Catalyst Charge | .001 Lb/Hr |
| Catalyst | LYNX 900 (Catalyst Resources Inc.) |
| Cocatalyst | $Et_3Al$ |
| Electron Donor | 1,4-Dimethyl piperazine |
| Electron Donor/Cocatalyst /Catalyst Mole Ratio | 0.12/1/1 |
| Terpolymer produced | 3.08 Lb/Hr |
| Percent Solids (polymer) in Reactor | 20.3% |
| Propylene Conversion | 79.7% |
| Hexene-1 Conversion | 35.0% |
| Ethylene Conversion | 98.5% |
| Catalyst Yield | 2145 Lb polymer/Lb catalyst |
| Reactor Temperature | 130° C. |

-continued

| | |
|---|---|
| Reactor Jacket Temperature | 80° C. |
| Reactor Pressure | 1040 psig |
| Stirrer Speed | 900 rpm |

The terpolymer produced had a melt flow rate of 2.1 g/10 minutes and contained 9 percent ethylene units and 15 percent hexene units by Carbon 13 NMR spectroscopy. The DSC glass transition temperature was (−32)° C. and the DMTA (Dynamic Mechanical Thermal Analysis) Glass transition temperature was (−27)° C.

The elasticity of the terpolymer of the present invention was determined by measuring the tensile set of the terpolymer. "Tensile set" is the elongation remaining in a compression-molded specimen after it has been stretched at a rate of 51 centimeters per minute to 300 percent elongation at 22° to 24° C., then immediately allowed to recover at the same rate until the specimen is at zero stress. It is expressed as a percentage of the original length or distance between benchmarks. The tensile set is one cycle of the hysterisis test. The tensile set for the terpolymer produced by this Example was found to be 79 percent. The tensile strength was 500 psi at break and it did not have a yield point. All tensile and stress-strain measurements were carried out on straight or dumbbell specimens 0.25 inch (0.64 cm) wide and 0.018–0.080 inch (0.045–0.20 cm) thick by ASTM Method D-412.

The terpolymer produced by this Example did not exhibit a yield point. "Yield point" as used herein means that in the test of ASTM method D412 conducted to break at 51 cm per minute and 25° C. there is a strain (or elongation) value at which the stress (force) required to further increase the elongation decreases.

This unique set of properties, high elongation and good recovery, suggests that this elastomer would be useful for making gaskets, tubing, and the like.

Example 2

This example describes the continuous preparation of ethylene hexene propylene terpolymers. A 6.7 gallon stirred loop reactor was fed continuously with propylene, hexene-1, mineral spirits, ethylene and catalyst in mineral spirits (catalyst mixture or slurry). The terpolymer, unreacted monomers, and solvent mixture containing catalyst was removed from the reactor continuously to a letdown tank. Unreacted monomers were flashed overhead. The terpolymer solvent mixture of approximately 25 percent solids was fed to an extruder where it was stripped and stabilized. The extrudate was cooled in a water bath and cut into pellets. Reactor conditions and monomer conversions were as shown:

| | |
|---|---|
| Propylene Charge | 3.20 Lb/Hr |
| Hexene-1 Charge | 1.40 Lb/Hr |
| Mineral Spirits Charge | 10.62 Lb/Hr |
| Ethylene Charge | 0.29 Lb/Hr |
| Catalyst Charge | .001 Lb/Hr |
| Catalyst | LYNX 900 (Catalyst Resources, Inc.) |
| Cocatalyst | $Et_3Al$ |
| Electron Donor | 1,4-Dimethyl piperazine |
| Electron Donor/Cocatalyst /Catalyst Mole Ratio | 0.12/1/1 |

| -continued | |
|---|---|
| Terpolymer produced | 3.10 Lb/Hr |
| Percent Solids (polymer) in Reactor | 20.0% |
| Propylene Conversion | 80.2% |
| Hexene-1 Conversion | 34.0% |

The terpolymer contained 10 percent ethylene and 16 percent hexene and had a melt flow rate of 2.8 g/10 minutes. The terpolymer exhibited no yield point in the stress strain curve and had a tensile set of 82%. The tensile strength at break was 480 psi. The elongation at break was 375 percent. The polymer was not tacky, but rather exhibited good properties for a polyolefin based elastomer.

What is claimed is:

1. A polyolefin terpolymer comprising about 5 to 25 weight percent ethylene units, from greater than about 5 to about 40 weight percent hexene units, and about 35 to less than about 90 weight percent propylene units; wherein the total weight percent of monomer units equals 100 percent; further wherein said terpolymer is elastomeric, is amorphous, has a melt flow rate of about 0.01 to 500 grams per 10 minutes (ASTM D-1238 condition F) and has a tensile set of about 65 to 120 percent, according to ASTM D-412.

2. The terpolymer of claim 1 comprising from greater than 10 to about weight percent ethylene units, from greater than 10 to about 40 weight percent hexene units, and about 35 to 85 weight percent propylene units.

3. The terpolymer of claim 1 comprising about 8 to 20 weight percent ethylene units, about 8 to 35 hexene units, and about 40 to 90 propylene units.

4. The terpolymer of claim 1 wherein the melt flow rate is about 1 to 100 grams per 10 minutes.

5. The terpolymer of claim 1 wherein said terpolymer has a tensile set of about 65 to 100 percent.

6. An article of manufacture made from the terpolymer of claim 1 selected from the group consisting of extruded goods, molded goods, films, and fibers.

7. An article of manufacture comprising a substrate having a coating of the terpolymer of claim 1.

* * * * *

UNITED STATES PATENT AND TRADEMARK OFFICE
CERTIFICATE OF CORRECTION

PATENT NO. : 6,084,047
DATED : July 4, 2000
INVENTOR(S) : Holliday et al.

It is certified that error appears in the above-identified patent and that said Letters Patent is hereby corrected as shown below:

Column 8, line 4 (Claim 2, line 2), between "about" and "weight", --- 25 --- should be inserted.

Signed and Sealed this

Twenty-ninth Day of May, 2001

*Attest:*

NICHOLAS P. GODICI

*Attesting Officer*   *Acting Director of the United States Patent and Trademark Office*